United States Patent
Avakian

(10) Patent No.: US 10,769,666 B2
(45) Date of Patent: *Sep. 8, 2020

(54) INTELLIGENT MARKETING AND ADVERTISING PLATFORM

(71) Applicant: Cooler Screens Inc., Chicago, IL (US)

(72) Inventor: Arsen Avakian, Chicago, IL (US)

(73) Assignee: Cooler Screens Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,643

(22) Filed: Dec. 17, 2018

(65) Prior Publication Data

US 2019/0122263 A1 Apr. 25, 2019

Related U.S. Application Data

(63) Continuation-in-part of application No. 15/674,198, filed on Aug. 10, 2017, now Pat. No. 10,672,032, and
(Continued)

(51) Int. Cl.
*G06Q 30/00* (2012.01)
*G06Q 30/02* (2012.01)
(Continued)

(52) U.S. Cl.
CPC ....... *G06Q 30/0261* (2013.01); *G06Q 10/087* (2013.01); *G06K 9/00624* (2013.01);
(Continued)

(58) Field of Classification Search
CPC ....... G06Q 30/0207–30/0277; G06Q 30/0643; G09F 2023/0033; G06K 2209/17
See application file for complete search history.

(56) References Cited

U.S. PATENT DOCUMENTS 2,002,322 A 5/1935 Kraemer
4,371,870 A 2/1983 Biferno
(Continued)

FOREIGN PATENT DOCUMENTS

DE 10205405 A1 8/2003
DE 102009003127 A1 11/2010
(Continued)

OTHER PUBLICATIONS

Neff, Jack. "New System Puts Video Ads on Store Cooler Doors", AdAge, https://adage.com/article/cmo-strategy/system-puts-video-ads-store-cooler-doors/301395, Nov. 18, 2015. (Year: 2015).*
(Continued)

*Primary Examiner* — Michael Bekerman
(74) *Attorney, Agent, or Firm* — Banner & Witcoff, Ltd.

(57) ABSTRACT

An intelligent marketing and advertising platform which provides an innovative merchandising solution for retailers by effectively transforming the glass surface of retail product containers (such as cooler doors) into a non-transparent display of planograms. The merchandising solution provides for digital planograms and pricing management, real time promotional updates and sales data, etc. This is accomplished by converting/transforming the simple glass surface of a retail product container (such as cooler/freezer doors) into digital "smart" screens that provide for innovative advertising solutions. The cooler/freezer doors are configured to use at least one camera to capture images when the doors are opened, in order to effectively take inventory of what is inside the cooler/freezer.

20 Claims, 12 Drawing Sheets

System Architecture: Display array with sensors and cameras driven by Remote/Networked video controllers and encased in protective enclosure

Related U.S. Application Data a continuation-in-part of application No. PCT/US2018/046103, filed on Aug. 9, 2018.

(51) Int. Cl.
*G06Q 10/08* (2012.01)
*G06K 9/00* (2006.01)
*H04N 5/225* (2006.01)
*G06Q 30/06* (2012.01)
*G09F 23/00* (2006.01)

(52) U.S. Cl.
CPC ..... *G06K 2209/17* (2013.01); *G06Q 30/0251* (2013.01); *G06Q 30/0643* (2013.01); *G09F 2023/0033* (2013.01); *H04N 5/2253* (2013.01)

(56) References Cited

U.S. PATENT DOCUMENTS

| | | |
|---|---|---|
| 4,671,582 A | 6/1987 | Stromquist et al. |
| 4,893,902 A | 1/1990 | Baughman et al. |
| 4,998,382 A | 3/1991 | Kostos et al. |
| 5,024,023 A | 6/1991 | Kostos et al. |
| 5,111,618 A | 5/1992 | Kaspar et al. |
| 5,116,274 A | 5/1992 | Artwohl et al. |
| 5,255,473 A | 10/1993 | Kaspar et al. |
| 5,270,843 A | 12/1993 | Wang |
| 5,645,330 A | 7/1997 | Artwohl et al. |
| 6,005,652 A | 12/1999 | Matsuhira |
| 6,148,563 A | 11/2000 | Roche et al. |
| 6,377,228 B1 | 4/2002 | Jenkin et al. |
| 6,427,772 B1 | 8/2002 | Oden et al. |
| 6,475,087 B1 | 11/2002 | Cole |
| 6,476,885 B1 | 11/2002 | Murray et al. |
| 6,606,832 B2 | 8/2003 | Richardson et al. |
| 6,606,833 B2 | 8/2003 | Richardson et al. |
| 6,874,903 B2 | 4/2005 | Yang et al. |
| 7,072,096 B2 | 7/2006 | Holman et al. |
| 7,121,675 B2 | 10/2006 | Ter-Hovhannisian |
| 7,259,359 B2 | 8/2007 | Davey et al. |
| 7,290,707 B2 | 11/2007 | Sawasaki |
| 7,319,407 B2 | 1/2008 | Jang et al. |
| 7,377,125 B2 | 5/2008 | Seiden et al. |
| 7,413,233 B1 | 8/2008 | Jung |
| 7,513,637 B2 | 4/2009 | Kelly et al. |
| 7,593,867 B2 | 9/2009 | Deakin et al. |
| 7,824,056 B2 | 11/2010 | Madireddi et al. |
| 7,870,686 B2 | 1/2011 | Hines |
| 7,934,384 B2 | 5/2011 | Tuskiewicz et al. |
| 7,978,184 B2 | 7/2011 | Morrison |
| 8,009,864 B2 | 8/2011 | Linaker et al. |
| 8,189,855 B2 | 5/2012 | Opalach et al. |
| 8,219,438 B1 | 7/2012 | Moon et al. |
| 8,468,059 B2 | 6/2013 | Enqvist |
| 8,630,924 B2 | 1/2014 | Groenevelt et al. |
| 8,672,427 B2 | 3/2014 | Hammonds |
| 8,683,745 B2 | 4/2014 | Artwohl et al. |
| 8,955,261 B2 | 2/2015 | Kobe et al. |
| 8,972,291 B2 | 3/2015 | Rimnac et al. |
| 9,046,294 B2 | 6/2015 | Lee et al. |
| 9,052,536 B2 | 6/2015 | Artwohl et al. |
| 9,098,825 B2 | 8/2015 | Bashkin |
| 9,144,328 B2 | 9/2015 | Seeley |
| 9,230,386 B2 | 1/2016 | Roh et al. |
| 9,361,628 B2 | 6/2016 | Stark |
| 9,514,661 B2 | 12/2016 | Riegel |
| 9,524,419 B2 | 12/2016 | Chang |
| 9,560,777 B2 | 1/2017 | Knetzman et al. |
| 9,575,558 B2 | 2/2017 | Almen et al. |
| 9,689,603 B2 | 6/2017 | Roh et al. |
| 9,710,992 B2 | 7/2017 | Borra |
| 9,881,528 B2 | 1/2018 | Dunn |
| 9,911,377 B2 | 3/2018 | Howard et al. |
| 9,959,568 B2 | 5/2018 | Klearman |
| 9,967,109 B2 | 5/2018 | Nishimura et al. |
| 9,972,284 B2 | 5/2018 | Lee et al. |
| 10,062,257 B2 | 8/2018 | Chau |
| 10,085,571 B2 | 10/2018 | Schiffman et al. |
| 10,122,915 B2 | 11/2018 | Maayan et al. |
| 10,126,849 B2 | 11/2018 | Lee et al. |
| 10,169,677 B1 | 1/2019 | Ren et al. |
| 10,258,170 B2 | 4/2019 | Dunn et al. |
| 10,282,695 B1 | 5/2019 | McNamara et al. |
| 10,304,417 B2 | 5/2019 | Park et al. |
| 10,360,571 B2 | 7/2019 | Garel et al. |
| 2001/0010516 A1 | 8/2001 | Roh et al. |
| 2001/0052741 A1 | 12/2001 | Yun |
| 2002/0007486 A1 | 1/2002 | Yun |
| 2003/0038912 A1 | 2/2003 | Broer et al. |
| 2003/0117790 A1 | 6/2003 | Lee et al. |
| 2003/0205059 A1 | 11/2003 | Roche et al. |
| 2003/0207090 A1 | 11/2003 | Arora |
| 2003/0214619 A1 | 11/2003 | Masuda et al. |
| 2004/0073334 A1 | 4/2004 | Terranova |
| 2004/0093379 A1 | 5/2004 | Roh et al. |
| 2004/0144328 A1 | 7/2004 | Bonner et al. |
| 2004/0160388 A1 | 8/2004 | O'Keeffe |
| 2004/0194388 A1 | 10/2004 | Roche et al. |
| 2005/0068629 A1 | 3/2005 | Fernando et al. |
| 2005/0172654 A1 | 8/2005 | Rohrer et al. |
| 2005/0202178 A1 | 9/2005 | Roche et al. |
| 2005/0265019 A1 | 12/2005 | Sommers et al. |
| 2006/0103269 A1 | 5/2006 | Artwohl et al. |
| 2006/0127586 A1 | 6/2006 | Roche et al. |
| 2006/0145576 A1 | 7/2006 | Lee et al. |
| 2006/0158579 A1 | 7/2006 | Hasegawa |
| 2006/0174641 A1 | 8/2006 | Liu et al. |
| 2006/0192767 A1 | 8/2006 | Murakami |
| 2007/0003700 A1 | 1/2007 | Roche et al. |
| 2007/0016478 A1 | 1/2007 | Hill |
| 2007/0024822 A1 | 2/2007 | Cortenraad et al. |
| 2007/0058114 A1 | 3/2007 | Niiyama et al. |
| 2007/0076431 A1 | 4/2007 | Atarashi et al. |
| 2007/0151274 A1 | 7/2007 | Roche et al. |
| 2007/0162182 A1 | 7/2007 | Marti et al. |
| 2007/0171647 A1 | 7/2007 | Artwohl et al. |
| 2007/0193280 A1 | 8/2007 | Tuskiewicz et al. |
| 2007/0195535 A1 | 8/2007 | Artwohl et al. |
| 2007/0216657 A1 | 9/2007 | Konicek |
| 2008/0004950 A1 | 1/2008 | Huang et al. |
| 2008/0024047 A1 | 1/2008 | Juo et al. |
| 2008/0158858 A1 | 7/2008 | Madireddi et al. |
| 2009/0002990 A1 | 1/2009 | Becker et al. |
| 2009/0036208 A1 | 2/2009 | Pennington et al. |
| 2009/0052206 A1 | 2/2009 | Matsui et al. |
| 2009/0121970 A1 | 5/2009 | Ozbek |
| 2009/0146945 A1 | 6/2009 | Cho |
| 2009/0276319 A1 | 11/2009 | Lungu et al. |
| 2009/0295731 A1 | 12/2009 | Kim et al. |
| 2009/0306820 A1 | 12/2009 | Simmons et al. |
| 2010/0013925 A1 | 1/2010 | Fowler et al. |
| 2010/0026912 A1 | 2/2010 | Ho |
| 2010/0043293 A1 | 2/2010 | Nicholson et al. |
| 2010/0062152 A1 | 3/2010 | Roche et al. |
| 2010/0068398 A1 | 3/2010 | Roche et al. |
| 2010/0083672 A1 | 4/2010 | Yoon et al. |
| 2010/0119705 A1 | 5/2010 | Roche et al. |
| 2010/0152892 A1 | 6/2010 | Gavra et al. |
| 2010/0180615 A1 | 7/2010 | Linder et al. |
| 2010/0214786 A1 | 8/2010 | Nichol |
| 2010/0275477 A1 | 11/2010 | Kim |
| 2010/0293827 A1 | 11/2010 | Suss et al. |
| 2011/0083460 A1 | 4/2011 | Thomas et al. |
| 2011/0098849 A1 | 4/2011 | Hudis et al. |
| 2011/0116231 A1 | 5/2011 | Dunn et al. |
| 2011/0141011 A1 | 6/2011 | Lashina et al. |
| 2011/0150276 A1 | 6/2011 | Eckhoff et al. |
| 2011/0173082 A1 | 7/2011 | Breitenbach et al. |
| 2011/0181792 A1 | 7/2011 | Hammonds |
| 2012/0004769 A1 | 1/2012 | Hallenbeck et al. |
| 2012/0105424 A1 | 5/2012 | Lee et al. |
| 2012/0285089 A1 | 11/2012 | Artwohl et al. |
| 2013/0063326 A1 | 3/2013 | Riegel |
| 2013/0271696 A1 | 10/2013 | Dunn |

(56) References Cited

U.S. PATENT DOCUMENTS

| | | | |
|---|---|---|---|
| 2013/0325638 A1 | 12/2013 | Auclair et al. | |
| 2014/0078407 A1 | 3/2014 | Green et al. | |
| 2014/0126829 A1* | 5/2014 | Seeley | G06K 9/00671 382/218 |
| 2014/0129393 A1 | 5/2014 | Soon-Shiong | |
| 2014/0232958 A1 | 8/2014 | Venturas et al. | |
| 2014/0344118 A1 | 11/2014 | Parpia et al. | |
| 2015/0073590 A1 | 3/2015 | Garcia Manchado et al. | |
| 2016/0143459 A1 | 5/2016 | Clein | |
| 2016/0220039 A1 | 8/2016 | Chang et al. | |
| 2017/0027339 A1 | 2/2017 | Chang et al. | |
| 2017/0046991 A1 | 2/2017 | Riegel | |
| 2017/0124603 A1 | 5/2017 | Olson | |
| 2017/0147971 A1 | 5/2017 | Morse et al. | |
| 2017/0329078 A1 | 11/2017 | Dunn et al. | |
| 2018/0020847 A1 | 1/2018 | Dunn et al. | |
| 2018/0053226 A1 | 2/2018 | Hutton et al. | |
| 2018/0061283 A1 | 3/2018 | Kim et al. | |
| 2018/0103778 A1 | 4/2018 | Olovsson | |
| 2018/0226056 A1 | 8/2018 | Chan | |
| 2018/0335252 A1* | 11/2018 | Oh | G06K 9/00771 |
| 2018/0365630 A1 | 12/2018 | Seals et al. | |
| 2019/0050900 A1 | 2/2019 | Avakian | |
| 2019/0122263 A1 | 4/2019 | Avakian | |
| 2019/0149725 A1 | 5/2019 | Adato et al. | |
| 2019/0213545 A1 | 7/2019 | Adato et al. | |

FOREIGN PATENT DOCUMENTS

| | | | |
|---|---|---|---|
| EP | 2194222 A2 | 6/2010 |
| JP | 2003125904 A | 5/2003 |
| JP | 2014206320 A | 10/2014 |
| JP | 2015169412 A | 9/2015 |
| KR | 20150093289 A | 8/2015 |
| WO | 9838547 A1 | 9/1998 |
| WO | 2017127035 A1 | 7/2017 |
| WO | 2019032893 A1 | 2/2019 |

OTHER PUBLICATIONS

Advertising with Transparent LCD Displays; http://www.displays2go.com/Article/Advertising-Transparent-LCD-Displays-78; Jul. 28, 2016.
http://emotivev.com/products; at least as early as Jun. 5, 2017.
https://www.youtube.com/watch?v=2tlM9lereLc; at least as early as Jun. 5, 2017.
International Search Report of PCT/US19/66869 dated Mar. 16, 2020.
Written Opinion of PCT/US19/66869 dated Feb. 11, 2020.
https://www.youtube.com/watchv=2tlM9lereLc; at least as early as Jun. 5, 2017, "Digital Signage Transparent LCD Beverage Cooler Demo".
Oct. 24, 2018—(WO) International Search Report and Written Opinion—App PCT/US2018/046103.
Extended EP Search Report for EP 12782036, dated Jun. 9, 2015, 7 Pages.
U.S. Notice of Allowance on U.S. Appl. No. 14/170,378, dated Mar. 31, 2015, 10 Pages.
File History of U.S. Appl. No. 16/547,288, filed Aug. 21, 2019.
File History of U.S. Appl. No. 15/888,210, filed Feb. 5, 2018 (Pt. 1 349 pages).
File History of U.S. Appl. No. 15/888,210, filed Feb. 5, 2018 (Pt. 2 350 pages).
File History of U.S. Appl. No. 14/819,257, filed Aug. 5, 2015, (now U.S. Pat. No. 9,504,338).
File History of U.S. Appl. No. 14/686,958, Filed Apr. 15, 2015, (now U.S. Pat. No. 9,155,405).
File History of U.S. Appl. No. 14/170,378, filed Jan. 31, 2004, (now U.S. Pat. No. 9,052,536).
File History of U.S. Appl. No. 13/286,053, filed Oct. 31, 2011, (now U.S. Pat. No. 8,683,745).
File History of U.S. Appl. No. 61/484,616, filed May 10, 2011.
Aug. 22, 2019 U.S. Non-Final Office Action—U.S. Appl. No. 15/674,198.

* cited by examiner

FIG. 4
FIG. 5
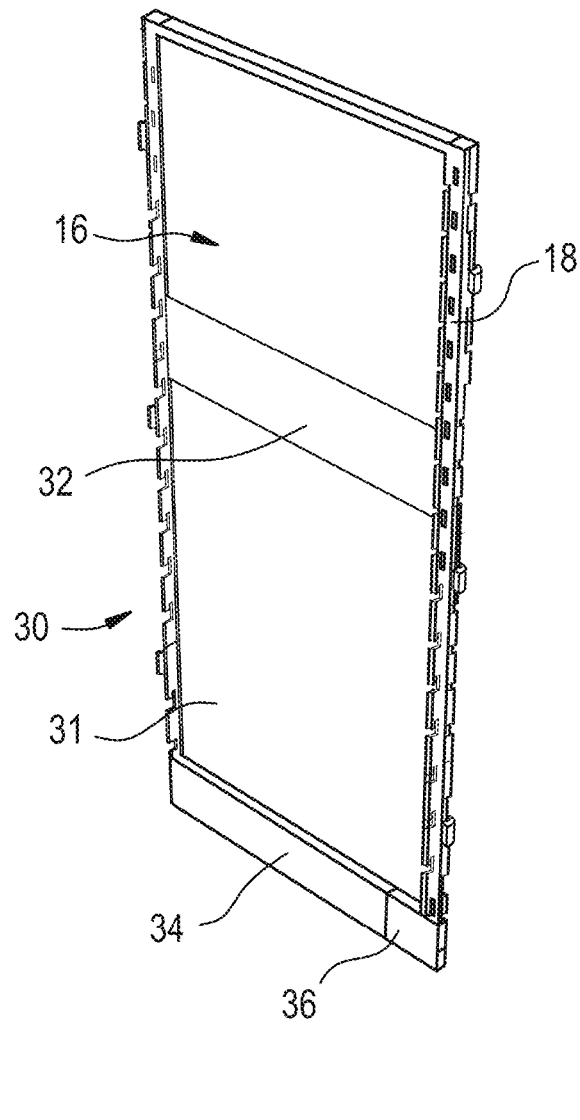
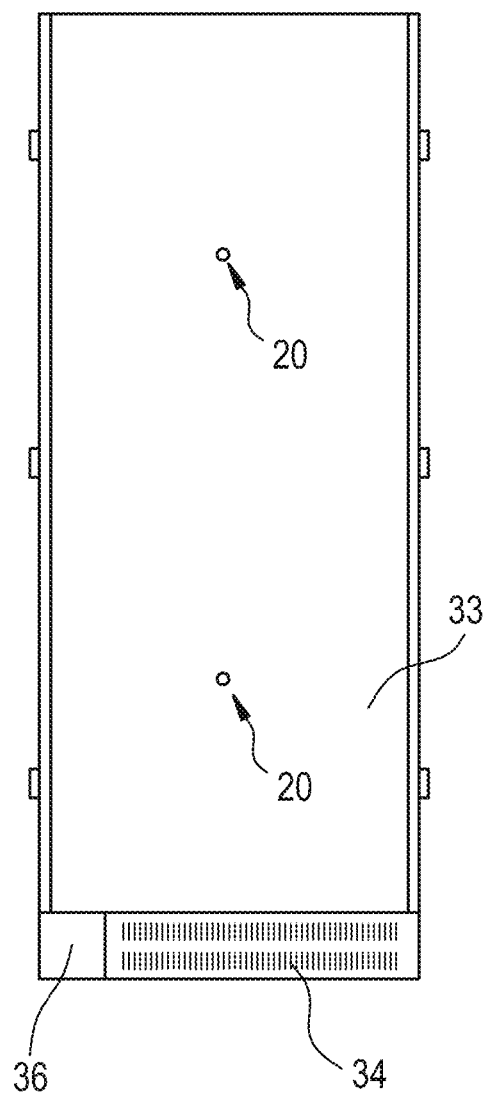

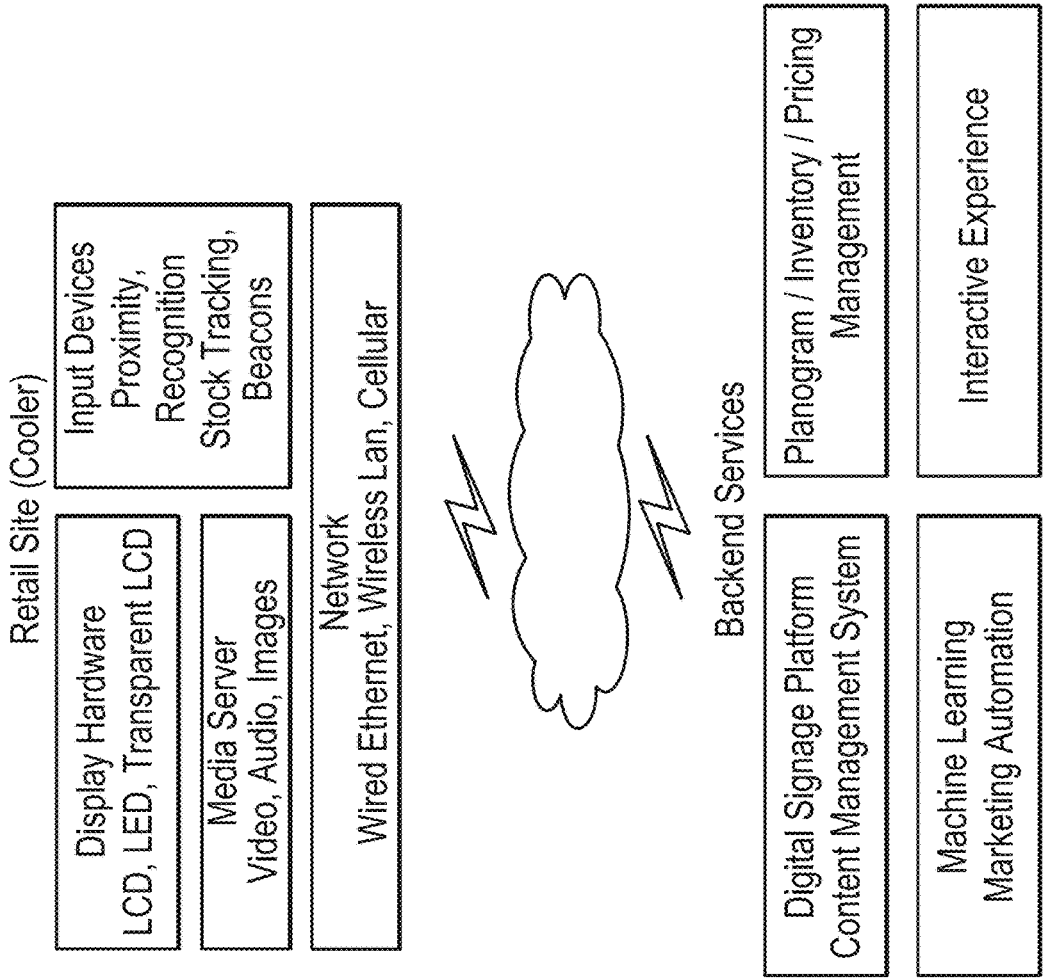
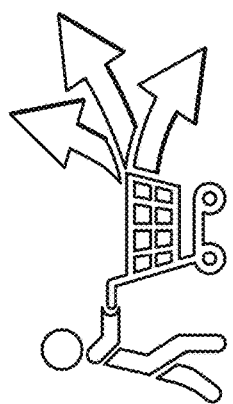
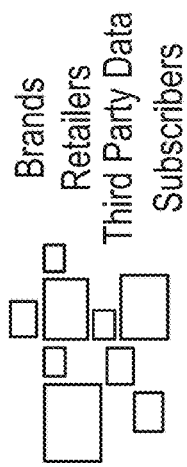
FIG. 6
Platform Stack

System Architecture: Display array with sensors and cameras driven by Remote/Networked video controllers and encased in protective enclosure

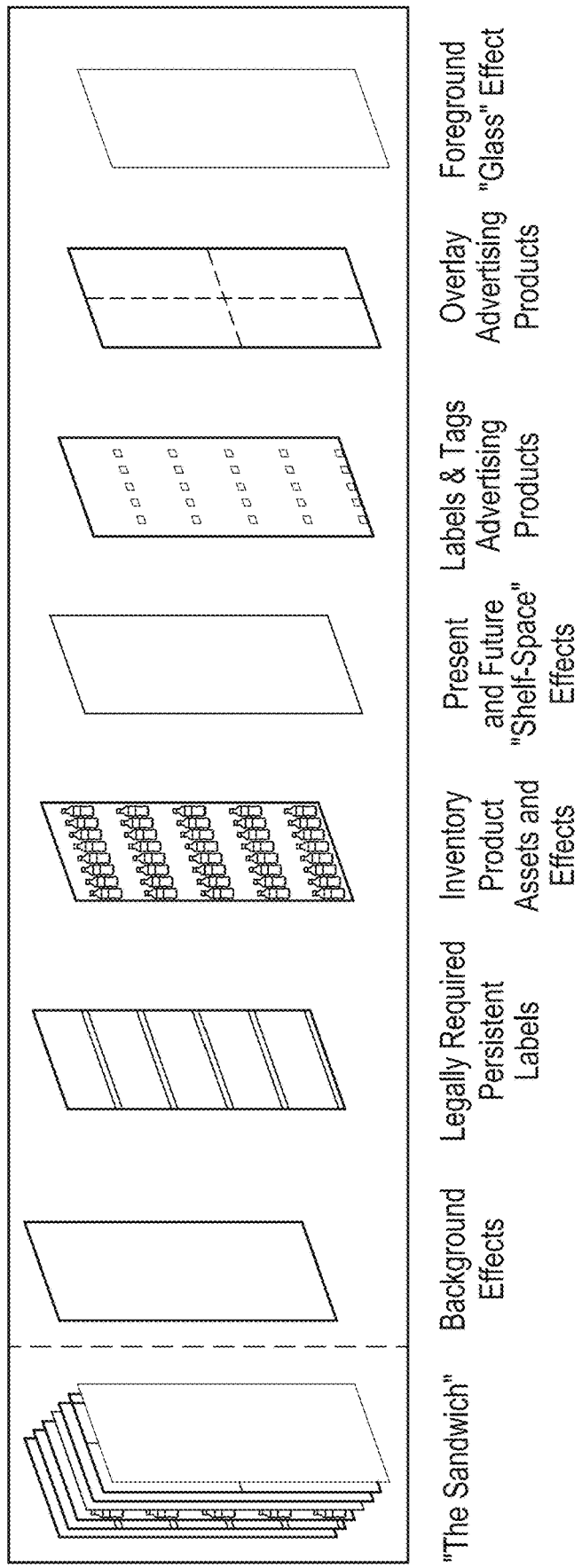

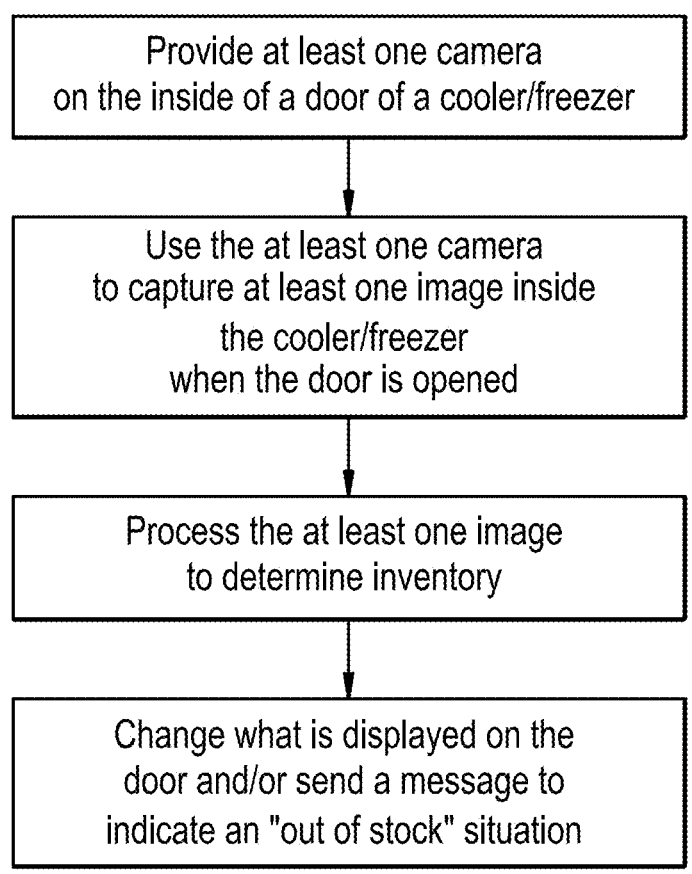

INTELLIGENT MARKETING AND ADVERTISING PLATFORM

RELATED APPLICATION

This application is a continuation-in-part of U.S. patent application Ser. No. 15/674,198, filed on Aug. 10, 2017, and International Application Number PCT/US18/46103, filed on Aug. 9, 2018, both of which are hereby incorporated herein by reference in their entirety.

BACKGROUND

The present invention generally relates to merchandising solutions, and more specifically relates to an intelligent marketing and advertising platform which employs digital "smart" screens on retail product containers thereby providing an innovative advertising solution.

Although more and more people are purchasing items online, brick and mortar retail sales are still substantial and are, in fact, growing in certain market segments such as grocery, drug and convenience stores. Over 75 percent of shopping in brick and mortar stores is impulse purchasing. Research shows that impulse decisions are highly influenced by in-store messaging, and that most of that in-store impulse shopping occurs at retail product containers, such as coolers and freezers.

If impulse shopping behavior can be disrupted by what is displayed on a retail product container, such as cooler or freezer doors, this would present an enormous value creation opportunity for both consumer packaged goods brands and retailers. Arguably, coolers are the most overlooked, least promoted, least technology sophisticated and one of the most operationally challenged sections of a retail store.

Conventional retail product containers such as coolers, freezers, vending machines, etc. have a glass panel or door through which a customer views products stored in the retail product container and which are available for purchase. Problems with this approach include the fact that oftentimes products stored therein are not neatly presented, products are blocked by other products such that a customer cannot easily see what products are available for purchase, etc. Still further, store employees are required to maintain the appearance of the products stored therein, keep track of stock, install and swap out promotional tags and other displays (such as displays relating to pricing and promotions) in order to keep those items current.

It is a well-understood problem that coolers and refrigerators in grocery stores are one area that is difficult for brands to conduct effective "on-the-spot" advertisements and promotions. Typically, brands rely on other advertising medias (e.g. print, billboards, online and TV advertisements, etc.) to promote products that are retailed on the shelves of coolers/freezers and/or refrigerators at retail and convenience stores. It is also widely acknowledged that current advertising efforts are not effective and impactful. Recognizing these inefficiencies several display manufacturers explored opportunities to convert the "see-thru" glass windows on the cooler doors into transparent displays that can enable running ads while the shoppers still see the products and continue their usual shopping experience. Transparent display technology that was being developed started to be targeted for these applications and were eventually integrated into cooler doors by several manufacturers. These systems allowed the conversion of these "passive" doors into an advertising platform while minimally disrupting a typical consumer shopping experience. The consumer could still see through and select the items they plan to pick; while the store owners or media platform owners can run promotional videos and advertisements on transparent display media. However, over the last few years it was evident that the market penetration of such systems has been very slow. There are a number of factors that have worked to limit adoption, such as:

1) the technology very expensive, requiring prohibitively-high up-front costs;
2) the overall visuals/aesthetics are not appealing to the consumer; and
3) lack of wide-spread adoption prevents the operators of bringing significant advertising revenues to justify business case.

Brands always seek media platforms that enable them to reach the critical mass of their target customer. For digital signage media platforms, this translates to a need for a very significant installed base.

SUMMARY

An object of an embodiment of the present invention is to provide an intelligent marketing and advertising platform.

Briefly, an embodiment of the present invention provides an intelligent marketing and advertising platform which comprises a plurality of retail product containers (such as coolers, freezers and/or vending machines). Each retail product container has internal storage volume, and each comprises at least one non-transparent display which prohibits viewing of the internal storage volume of the retail product container. Each retail product container further comprises customer-detecting hardware and inventory-taking hardware.

The platform also comprises a controller/data collector which is in communication with the retail product containers. The controller/data collector is configured to control the at least one non-transparent display of each retail product container such that each non-transparent display provides a planogram relating to retail products physically contained in the internal storage volume of the retail product container based on inventory taken by the controller/data collector using the inventory-taking hardware of the retail product container.

The controller/data collector is preferably configured to control the at least one non-transparent display of each retail product container to display current pricing information regarding products physically contained in the internal storage volume of the retail container, wherein the pricing is dictated by the controller/data collector.

The controller/data collector is preferably configured to detect customers using the customer-detecting hardware, and is configured to display promotions on the at least one non-transparent display of each retail product container based on what is detected by the controller/data collector using the customer-detecting hardware.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 4 illustrates the front of a door of a retail product container;

FIG. 5 is similar to FIG. 4, but illustrates the back of the door;

FIG. 6 illustrates solution architecture of the intelligent marketing and advertising platform;

FIG. 9 illustrates a "sandwich" of layers of possible content for the display disclosed herein;

FIG. 13 is a block diagram of a method that is in accordance with an embodiment of the present invention.

DESCRIPTION OF AN ILLUSTRATED EMBODIMENT

Figure 1:
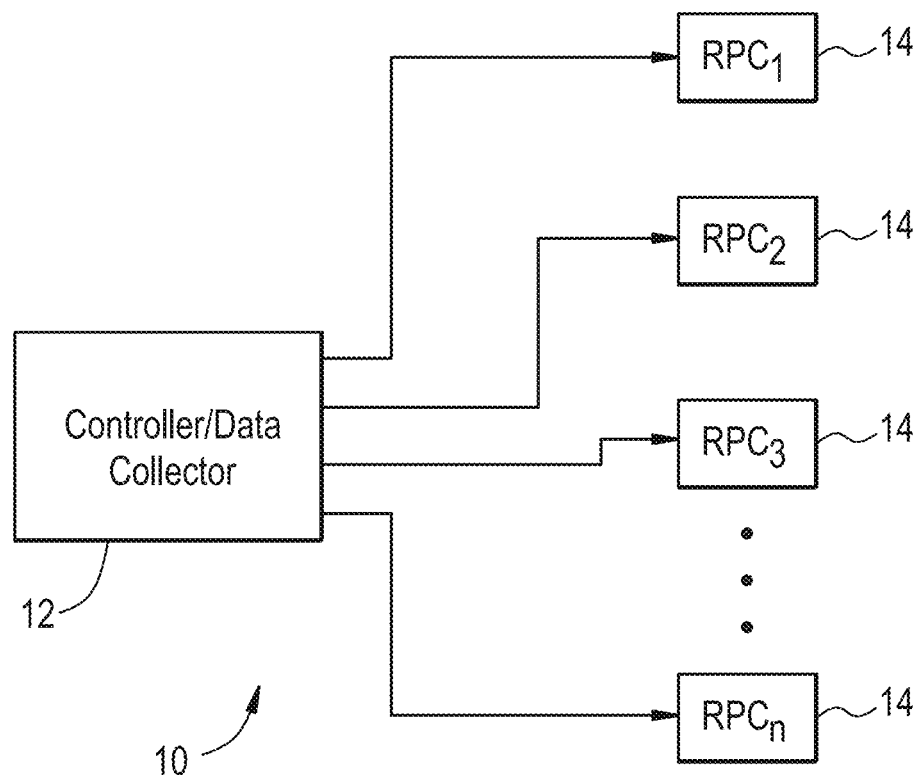
FIG. 1 illustrates an intelligent marketing and advertising platform which provides that a controller/data collector is networked with a plurality of retail product containers.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

FIG. 1 illustrates an intelligent marketing and advertising platform 10 which in accordance with an embodiment of the present invention. As shown, the intelligent marketing and advertising platform 10 provides that a controller/data collector 12 is networked with a plurality of retail product containers 14.

The retail product containers 14 need not be the same, but preferably each is a device such as a cooler, freezer and/or vending machine. Regardless, preferably each has internal storage volume in which products for purchase can be stored.

Figure 2:
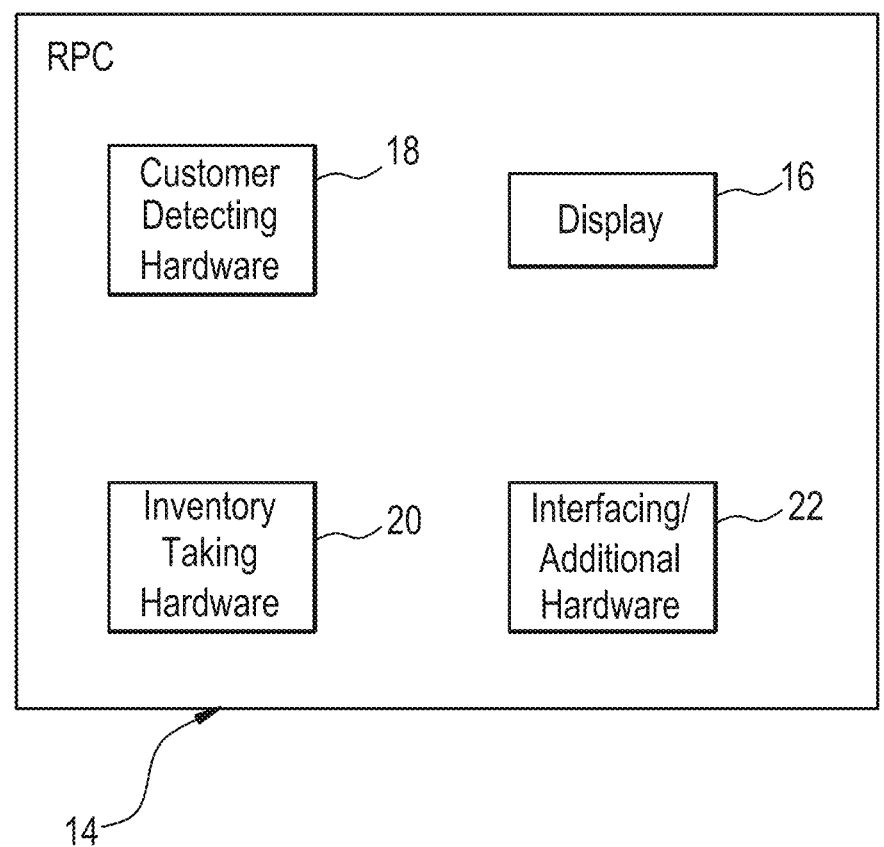
FIG. 2 illustrates some of the components of one of the retail product containers of the intelligent marketing and advertising platform illustrated in FIG. 1.

A shown in FIG. 2, preferably each retail product container 14 comprises at least one display 16, such as a display on a door of the retail product container 14. Preferably, the display 16 comprises a non-transparent display which prohibits customers from viewing, through the display, products which are being stored in the internal storage volume. The display 16 can comprise, for example, a touchscreen LCD with which customers can interact.

Preferably, each retail product container 14 further comprises customer-detecting hardware 18, such as one or more proximity sensors (such as heat maps), cameras, facial sensors or scanners, and eye-sensors (i.e., iris-tracking sensors).

Assuming cameras are employed, preferably cameras are mounted on doors of the retail product containers 14. Preferably, the cameras have a depth of field of view of twenty feet or more, and have a range of field of view of 170 degrees with preferably 150 degree of facial recognition ability. Preferably, software is employed in association with the cameras to monitor shopper interactions, serve up relevant advertisement content on the displays 16, and track advertisement engagement in-store. The controller/data collector 12 may be configured to independently control each camera, as well as collectively control a plurality of displays 16, to serve up single-screen and/or multiple screen content and interactions. Preferably, the controller/data collector 12 and displays 16 are configured to allow for both banner advertisements and full-screen advertisements to be displayed at the same time on a single display 16.

Preferably, each retail product container 14 further comprises inventory-taking hardware 20 such as additional cameras and/or sensors that are disposed inside the retail product container 14 and face the products.

As shown in FIG. 1, the controller/data collector 12 is networked (preferably a cloud network) with the retail product containers 14, such as via conventional means, such the Internet, Bluetooth, etc., via wired Ethernet, wireless LAN or a cellular network. The controller/data collector 12 is configured to control the displays 16 of the retail product containers 14, as well as is configured to receive information from the retail product containers 14, such as information from the displays 16 (such as information regarding touchscreen interactions), as well as information from the customer-detecting hardware 18 and inventory-taking hardware 20 of the retail product containers 14. As shown, each retail product container 14 includes interfacing/additional hardware 22 which is configured to facilitate, among other things, the networking and transfer of information (i.e., data) between the controller/data collector 12 and the retail product container 14 and overall control and function of the display 16, customer-detecting hardware 18 and inventory-taking hardware 20.

The controller/data collector 12 may comprise a server having one or more processors, memory storage, a user interface, etc. and is configured to not only dictate what is displayed on the displays 16 of the retail product containers 14 and receive information and data from the retail product containers 14, but is also preferably configured to perform analytics based on information and data which has been received.

Preferably, the controller/data collector 12 is configured to control the display 16 of each retail product container 14 such that each display 16 provides planograms relating to retail products physically contained in the internal storage volume of the retail product container 14 (but not viewable through the display 16) based on inventory taken by the controller/data collector 12 using the inventory-taking hardware 20 of the retail product container 14. As such, there is no downside to the fact that, in reality, products stored in the retail product container 14 may not be neatly stored therein, or that products stored therein may be blocked from view by other products stored therein. The planograms which are displayed on the displays 16 of the retail product containers 14 effectively optimize what is presented to the customer.

Preferably, the controller/data collector 12 is configured to control the display 16 of each retail product container 14 to display current pricing information regarding products physically contained in the internal storage volume of the retail product container 14, wherein the pricing is dictated by the controller/data collector 12.

Preferably, the controller/data collector 12 is configured to detect customers using the customer-detecting hardware 18, and is configured to display promotions on the at least display 16 based on what is detected by the controller/data collector 12 using the customer-detecting hardware 18.

As discussed above, the controller/data collector 12 effectively takes an inventory of each retail product container 14 (i.e., using the inventory-taking hardware 20 along with image recognition software). Preferably, the controller/data collector 12 is configured to transmit data to a distributor and/or store regarding overall stock relating to the inventory of the plurality of retail product containers 14. More specifically, the overall system can be configured to issue restock notifications, provide merchandising updates, pricing management, real time sales data and behavioral consumer analytics. As such, the system provides advertising, flawless merchandising, real time pricing and promotions, an inventory and direct store delivery solution and the power of analytics.

It should be noted that FIG. 2 only depicts some of the components of a retail product container 14 and the retail product container 14 will inevitably include other components, such as possibly a refrigeration unit, etc. which are not specifically relevant to the present invention.

Preferably, a plurality of retail product containers 14 and associated displays 16 are arranged side-by-side down an aisle of a retail store, such as a grocery store, and the controller/data collector 12 is configured to operate the displays 16 depending on what is detected by both the customer-detecting hardware 18 and inventory-taking hardware 20.

For example, preferably the controller/data collector 12 is configured to operate the displays 16 such that the displays 16 display full screen advertisements if no motion is detected (or motion is no longer detected) by the customer-detecting hardware 18. In other words, as a customer is approaching an aisle, the customer sees full screen advertisements on the displays 16.

Preferably, the controller/data collector 12 is configured such that if motion is detected within twenty feet of a retail product container 14 (i.e., by customer-detecting hardware 18) mounted on the door of that retail product container 14), the controller/data collector 12 operates that particular display 16 to stop displaying a full screen advertisement, and instead display a planogram of products which are located inside the retail product container 14. Preferably, banner advertisements and pricing tags are also loaded and displayed at the same time. Preferably, the controller/data collector 12 is configured to manage merchandising advertising objects and layers. This can be facilitated and managed remotely, or locally at an individual retail location such as by using a content management application.

Preferably, the controller/data collector 12 is configured such that as a shopper approaches closer to a given retail product container 14, the display 16 associated with the retail product container 14 changes again. For example, the display 16 can change such that it then displays labels (e.g., organic, non-gmo, etc.) and tags (e.g., sale with local card, locally made, trending, etc.). These promotional labels and tags can be activated via the controller/data collector 12 and can be either selected from a pre-determined set of static animated icons, or they can be customized by the retailer and/or brands based on their business and marketing needs. The controller/data collector 12 can be configured to incorporate customer rating scores (e.g., 1-5 stars, trending, favorites, etc.) using one or more consumer review sources.

Preferably, the controller/data collector 12 is configured such that as a shopper stands or lingers in front of a given retail product container 14, the display 16 associated with the retail product container 14 changes yet again. At this point, preferably the controller/data collector 12 has been able to use the customer-detecting hardware 18 to effectively learn more about that particular customer, such as gender, age, mood, etc. The controller/data collector 12 is configured to take what has been detected about the customer to determine which advertisement and other information to present to that particular customer on the display 16 associated with the retail product container 14 in front of which the customer is standing. By tracking shopper data in parallel with which advertising content is being served on all displays 16 within the viewing range of the shopper, the retailer and the brands are better served, providing new influence opportunities at the moment of purchasing decision, optimizing marketing spend and generating new revenue streams.

Preferably, the controller/data collector 12 and displays 16 are configured such that, while a shopper is standing in front of a given display 16 (as detected by a camera mounted on a door of that particular retail product container 14) relevant conditional ads are displayed on that display 16 such as real-time data relating to news events, weather, sporting events, etc. (i.e., in addition to information and advertisements relating to the contents of the retail product container 14, such as banner advertisements, horizontal advertisements, full screen advertisements, tags, labels, spot advertisements, etc.).

As discussed above, preferably the controller/data collector 12 is configured to keep track of the inventory of a given retail product container 14 by using inventory-taking hardware 20, such as one or more cameras and/or sensors on the inside of the retail product container 14. Preferably, when the controller/data collector 12 has determined that a given product is out of stock, the controller/data collector 12 takes this into consideration when controlling what is displayed on the display 16 of that particular retail product container 14. For example, out of stock artwork can be displayed and/or advertisements can be swapped, such that out of stock advertising opportunities can be sold to different brands, wherein certain advertisements are displayed given certain out of stock scenarios.

Figure 3:
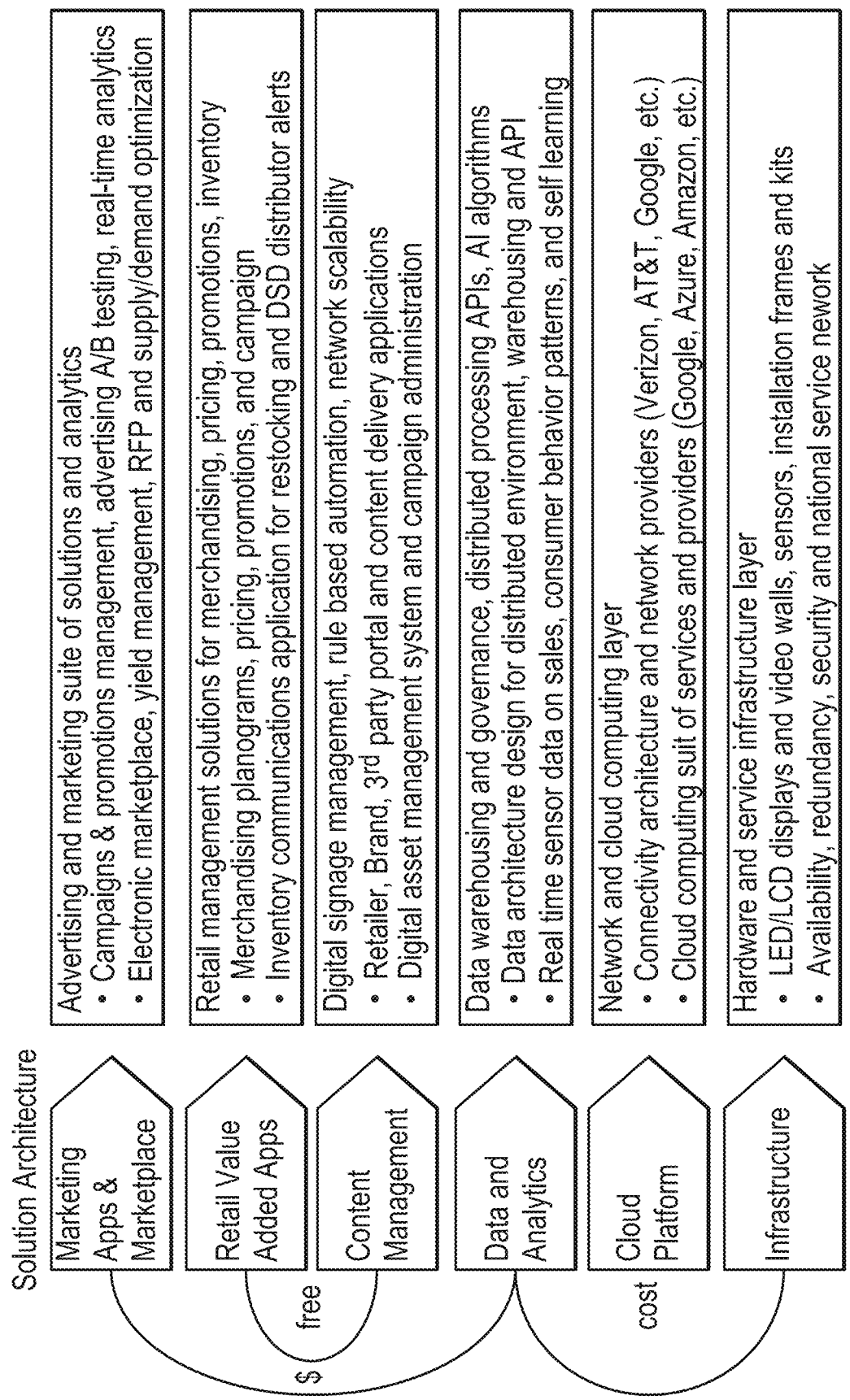
FIG. 3 illustrates the hardware stack of the intelligent marketing and advertising platform.

FIG. 3 illustrates the hardware stack of the platform. As shown, the hardware stack consists of an LCD display (i.e., display 16), display content supplied via dedicated PC-based media players, connected to the network via Edge router and equipped with smart IOT devices (i.e., cameras and sensors). The diagram shown in FIG. 6 describes the system configuration diagram and flow chart of the advertisement content and key hardware components involved. Preferably, proprietary UI/UX content products are generated, that are managed centrally (remotely) via network. This will help manage the media scheduling and any layout modifications remotely.

Additionally, preferably all inputs collected by the IOT devices will be analyzed locally as well as remotely (via cloud) to provide the feedback inputs for the system to push more relevant/targeted content, tailored for the consumer. The analytics are preferably conducted anonymously, images captured by cameras are preferably processed to collect statistics on consumer demographic characteristics: (such as age and gender). This data is preferably subsequently analyzed for additional statistics for the retailers that are valuable for in-store merchandise layout design and smart merchandizing, including the ability to track the shoppers "traffic" areas, known as "heat maps", areas were customers would concentrate more and spend more time exploring, etc.

Preferably, the interior facing cameras are utilized to ensure that products on the shelves are constantly monitored for out-of-stock warning. When a product is sold out, the signal preferably alerts the system to update the layout on the display as well as the store operator.

Preferably, by default, the platform is preferably programmed to run full screen advertisements. Customer-facing cameras are programmed to have motion detection capability, analyze an approaching customer, and switch the system to display planograms of products placed on the shelves. Further analytics based on the images captured by these cameras preferably triggers tailored promotional ads.

Preferably, at least a portion of the display is configured to have interactive touch capability, enabling the shoppers to explore further detailed information about various products, while minimizing the interference with other shoppers who would be able to see all the products displayed on the planogram and be able to proceed and pick up the product of their choice.

The system may be configured to track eye movements of the consumer (such as by using powerful software tools coupled with specific hardware that uses infrared sources to track eye movements) and correlate gaze spots with advertisements. This amounts to a very powerful demonstration tool to measure the success of the advertisement and its ability to impact the decision of the shopping consumer.

As discussed above, preferably each retail storage container 14 has a door and a display 16 is mounted on that door along with customer-detecting hardware 18, such as one or more proximity sensors (such as heat maps), cameras, facial sensors or scanners, and eye-sensors (i.e., iris-tracking sensors). FIG. 4 illustrates the front 31 of the door 30 providing the display 16 and the customer-detecting hardware 18, such as a camera. As shown, preferably the display 16 is in the form of an LCD panel comprising one or more touch zones 32 which are interactive by the customer. An access panel 34 may be provided proximate the bottom of the door 30 along with a media player 36. Although not specifically shown, a protective panel may be generally mounted over the display 16.

As shown in FIG. 5, cameras or other types of sensors (i.e. inventory-taking hardware 20) may be provided on the back 33 of the door 30 which the controller/data collector 12 (shown in FIG. 1) can use to keep track of inventory regarding the interior contents of the retail product container 14.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

As a business model, the cooler doors of a retail store can be retrofit with "smart" cooler doors having displays, cameras and sensors that collectively measure, react, learn and communicate in order to optimize the metrics.

The intelligent marketing and advertising platform disclosed herein effectively prides for at least the following: the convergence of a brick and mortar retail establishment with e-commerce; in-store promotions as an electronic marketplace; real time and algorithmic-driven pricing and promotions; self-learning/machine-learning artificial intelligence algorithm-driven advertising which is personalized to a given consumer; behavior response and external data (i.e. weather, events, competition, etc.); and smart-sensor and digital merchandising for planogram compliance, automatic-restock, in-store audits, etc.

The advertising method for in-store retail signage disclosed herein effectively employs two primary technologies—large scale brand/product advertising rotations and planogram screens (preferably activated when a customer gets within three feet) with non-obtrusive ad banners or hot-spots.

Figure 7:
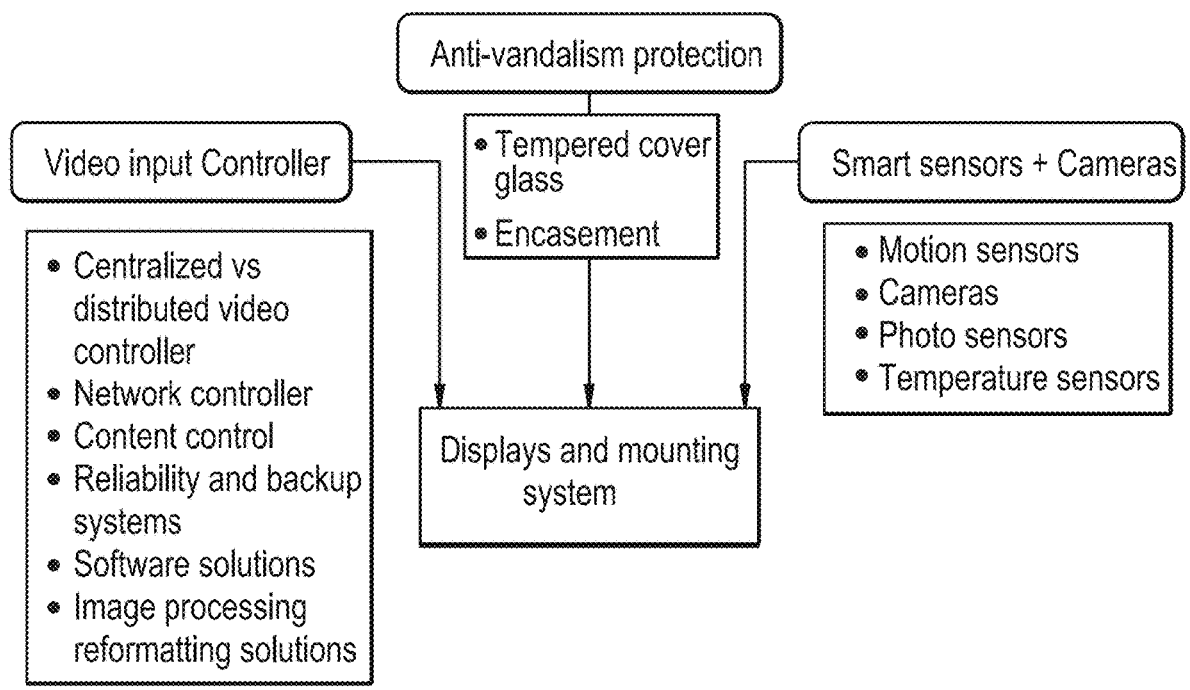
FIG. 7 illustrates one possible platform stack of the intelligent marketing and advertising platform.
Figure 8A:
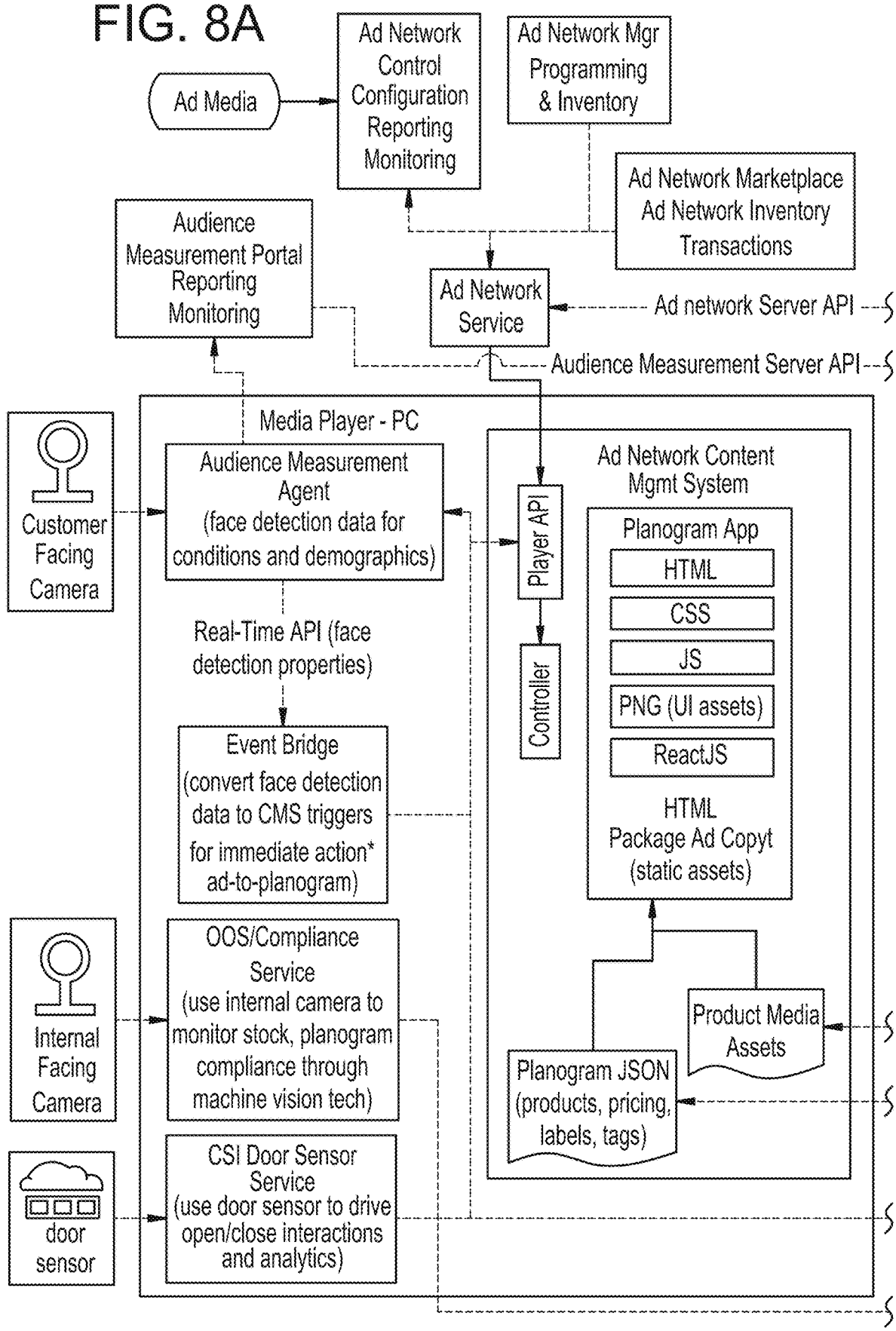
FIGS. 8A and 8B (the left half of which is FIG. 8A and the right half of which is FIG. 8B) illustrate one possible system architecture which can be implemented in connection with the present invention.
Figure 8B:
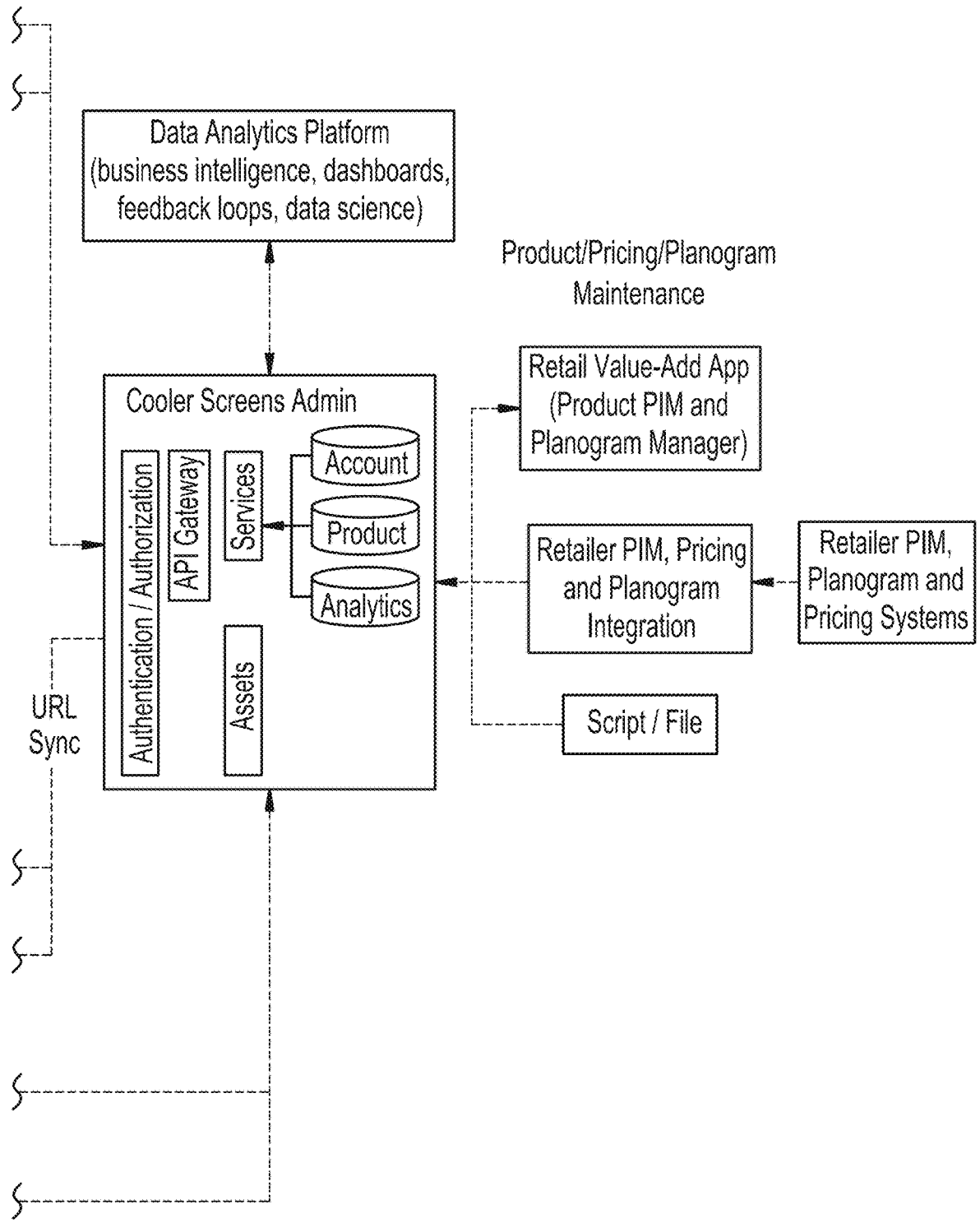
Figure 10:
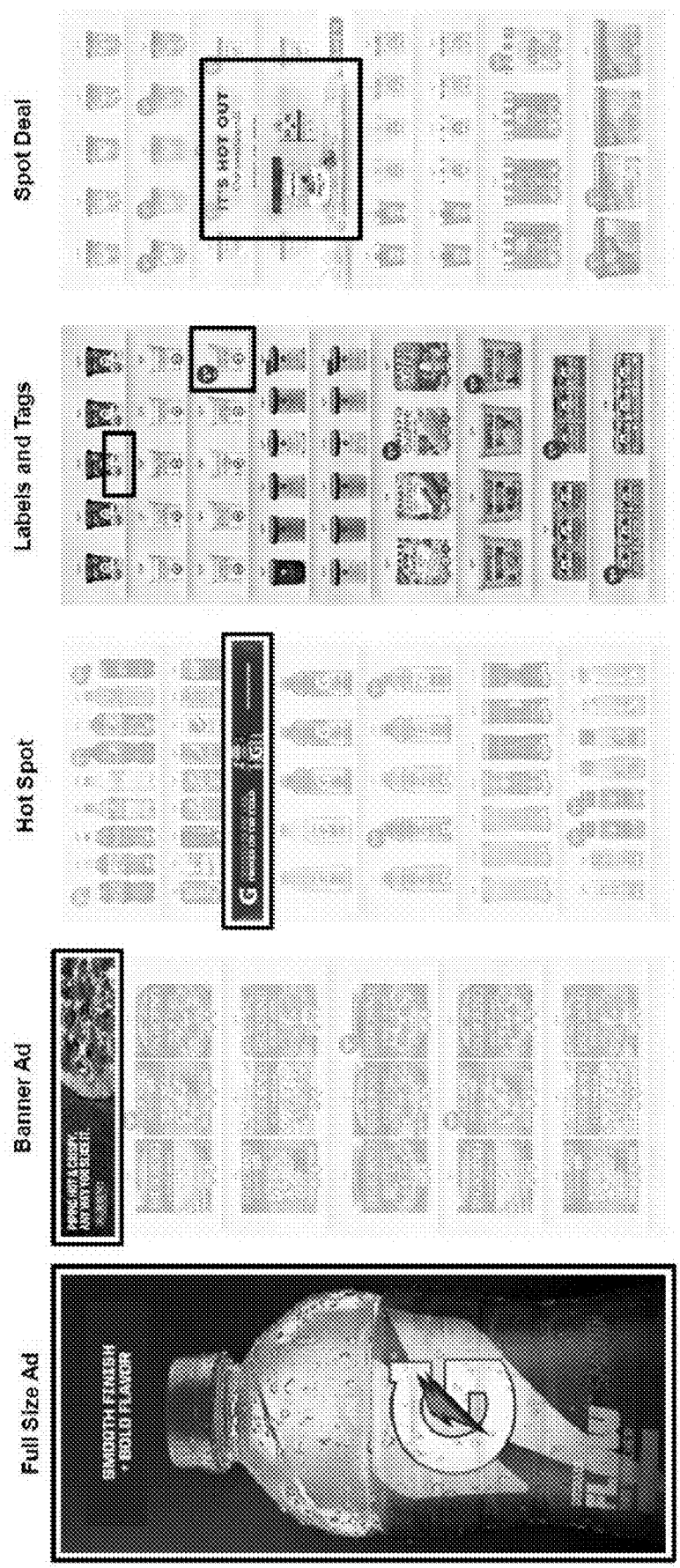
FIG. 10 is illustrates different types of advertisements that can be displayed on the display, such as full size advertisement, a banner advertisement, a hot spot, labels and tags, and a spot deal, for example.

FIG. 6 illustrates solution architecture of the intelligent marketing and advertising platform disclosed herein, FIG. 7 illustrates one possible platform stack of the intelligent marketing and advertising platform disclosed herein, and FIG. 8 (the left half of FIG. 8 is FIG. 8A and the right half of FIG. 8 is FIG. 8B) illustrates one possible system architecture which can be implemented in connection with the present invention. FIG. 9 illustrates a "sandwich" of layers of possible content for the display 16 disclosed herein. FIG. 10 is illustrates different types of advertisements that can be displayed on the display 16, such as full size advertisement, a banner advertisement, a hot spot, labels and tags, and a spot deal, for example. FIGS. 6-10 are self-explanatory.

As discussed above, each retail product container 14 preferably comprises inventory-taking hardware 20, such as cameras, that are disposed inside the retail product container 14 and face the products. Specifically, the cameras may be provided on the back 33 of the door 30 which the controller/data collector 12 (shown in FIG. 1) can use to keep track of inventory regarding the interior contents of the retail product container 14. In other words, the controller/data collector 12 is preferably configured to keep track of the inventory of a given retail product container 14 by using the cameras.

As such, an embodiment of the present invention effectively provides an automated ability to detect the inventory of products placed inside each retail product container 14 and update the planograms that are displaying the products on the display 16 (such as an LCD screen). If any item has gone "out of stock," preferably the system is configured to detect and update the information on the display 16 to guide the consumers and store operators.

Preferably, the automatic detection system utilizes cameras, pointed to take pictures of the interior shelves of the retail product container 14 in conjunction with software that utilizes smart algorithms to conduct image analysis and subsequent analytics to extract the required information.

Figure 11:
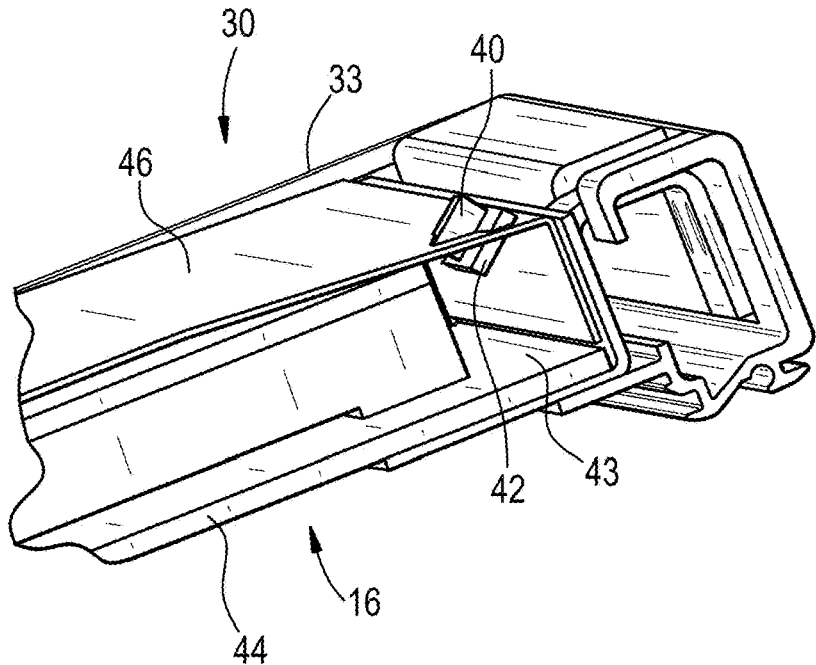
FIG. 11 shows a portion of a door of the retail product container shown in cross-section.

While one embodiment could provide that numerous cameras are placed in arrays to image and assemble the entire shelf area by adding individual pictures together using software, an array of cameras, however, poses challenges as all of them must be plugged into the operating PC which typically has limited number of inputs. Therefore, a more preferred embodiment is shown in FIG. 11, wherein cameras (one of the cameras is identified with reference numeral 40 in FIG. 11) are mounted on the edge of the back 33 of the door 30, and preferably the cameras are housed on brackets 42 tilted at an angle to enable taking pictures when the door 30 is swung open.

Figure 12:
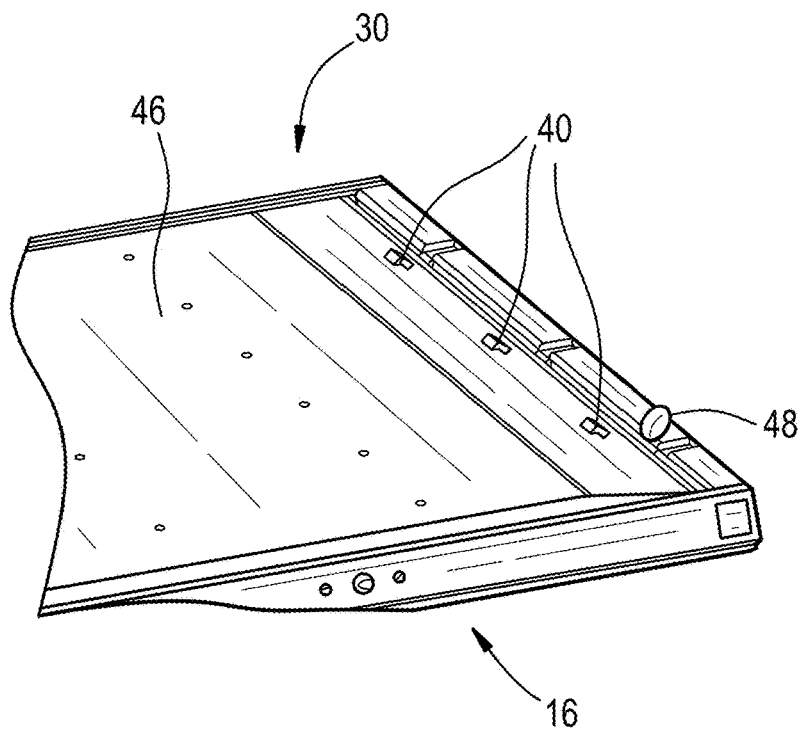
FIG. 12 also shows a portion of the door.

While an embodiment of the present invention could provide that wide field of view cameras (e.g. 180° FOV ("fisheye")) are utilized because they provide for large area coverage, typically the image quality from such cameras is inadequate as objects get severely distorted on the edges, limiting the software's capability to "recognize" the images with regard to the image processing step. As such, a more preferred embodiment provides that miniature cameras with 120° Field of View (Diagonal) are mounted on 45° angled housings along the edge on the handle side of the door 30. As shown in FIG. 11, preferably the cameras are housed within an empty bezel space 43, between the display panel assembly 44 and the unit's mechanical frame 46. Any number of cameras can be provided on the inside of each door of each retail product container 14. For example, as shown in FIG. 12, three cameras 40 may be distributed at an equal distance along the height of each door 30 to allow for complete height and width coverage of the shelf space (i.e., inside the retail product container 14).

Preferably, the system is configured such that during door operation (i.e., when the door 30 is opened), the cameras 40 get triggered and take pictures at various intervals when the door 30 is open. Preferably, the system is configured to process the images and effectively reconstruct the entire shelf. The system may be configured such that the cameras get triggered in any number of ways. For example, the system could be configured such that the cameras get triggered by:

1) Motion being sensed by one or more cameras (if this is the case, preferably the system is configured such that at least one of the cameras remains on all the time); and/or
2) Door motion being effectively sensed by one or more accelerometers 48 (see FIG. 12) on the door 30, wherein the system is configured such that the action of the cameras 40 gets triggered depending on various swing states and locations of the door 30 (i.e., when the door 30 gets opened).

Regardless of exactly what triggers the cameras, preferably the system is configured such that images captured by the cameras are effectively "stitched" together to reconstruct the entire shelf space. Preferably, the system is configured to utilize image processing compare the images and conclude whether any of the products on shelves are missing. If any of the particular products are missing, preferably the system is configured to send a signal to content management software to update the planogram appropriately (i.e., on the display 16), preferably displaying that product as being "out of stock". Additionally, preferably the system is configured to notify a store inventory management team, such that re-stocking of that particular item on that particular shelf can take place quickly.

FIG. 13 provides a block diagram of a method that is in accordance with an embodiment of the present invention and is self-explanatory given the foregoing description.

While a specific embodiment of the invention has been shown and described, it is envisioned that those skilled in the art may devise various modifications without departing from the spirit and scope of the present invention.

What is claimed is:

1. A door system for a retail cooling storage container, said door system comprising:
    a non-transparent display on a surface of the retail cooling storage container that prohibits viewing of an internal storage volume of the retail cooling storage container;
    at least one camera pointing into internal storage volume of the retail cooling storage container, wherein the non-transparent display displays different things depending on what is detected by the at least one camera;
    a computer processor;
    a tangible non-transitory computer memory storing computer-executable instructions that, when executed by the computer processor, cause the door system to:
        receive, from the at least one camera, an inventory of one or more retail products physically contained in the internal storage volume of the retail cooling storage container;
        generate, by the processor, a planogram of the one or more retail products physically contained in the internal storage volume of the retail cooling storage container;
        display, on the non-transparent display, the planogram of the one or more retail products with current pricing information positioned alongside the one or more retail products on the planogram, wherein in a closed position, the non-transparent display blocks viewability from outside of the retail cooling storage container of the one or more retail products physically contained in the internal storage volume;
        display, on the non-transparent display, a promotion of a retail product of the one or more retail products physically contained in the internal storage volume based on customer behavior analytics.

2. The door system as recited in claim 1, wherein the door system is configured to be controlled by a controller that is networked with a plurality of other doors.

3. The door system as recited in claim 1, wherein the at least one camera captures at least one image when a door with the non-transparent display is opened.

4. The door system as recited in claim 1, wherein the at least one camera captures a plurality of images when a door with the non-transparent display is opened, the computer memory further storing computer-executable instructions that, when executed by the processor, cause the door system to:
    trigger, by the processor, the at least one camera to capture, at intervals when the door is opened, the plurality of images.

5. The door system of claim 4, wherein the triggering of the at least one camera at intervals occurs based on motion sensed by the at least one camera.

6. The door system of claim 4, wherein the triggering at intervals of the at least one camera occurs based on inputs received by one or more accelerometers affixed to the door, wherein the triggering depends on a swing state and location of the door.

7. The door system as recited in claim 1, wherein a door with the non-transparent display has a back, wherein the at least one camera is mounted on the back of the door, wherein the at least one camera is tilted at an angle relative to the door.

8. The door system of 7, wherein the at least one camera is tilted at a 45° angle relative to the door and is mounted along an edge of a handle side of the door.

9. The door system as recited in claim 1, wherein a door with the non-transparent display comprises a mechanical frame, wherein the at least one camera is housed within an empty bezel space between the display and the mechanical frame.

10. The door system of claim 9, wherein three cameras are housed within the empty bezel space between the display and the mechanical frame at equal distances along a height of the door.

11. The door system as recited in claim 1, wherein the at least one camera starts taking images upon the at least one camera detecting a door with the non-transparent display being opened.

12. The door system as recited in claim 1, further comprising at least one accelerometer on a door with the non-transparent display, wherein the at least one camera starts taking images upon the at least one accelerometer detecting the door being opened.

13. The door system of claim 1, the computer memory further storing computer-executable instructions that, when executed by the processor, cause the door system to:
receive, via a customer-detecting hardware at the retail cooling storage container, activation of the non-transparent display to display the promotion of the retail product.

14. The door system of claim 1, the computer memory further storing computer-executable instructions that, when executed by the processor, cause the door system to:
determine, based on the inventory of the one or more retail products physically contained in the internal storage volume of the retail cooling storage container, that a particular product is missing;
send a signal to a content management system to update the planogram to indicate that the particular product is out of stock; and
display, on the non-transparent display, the updated planogram with the indication of out of stock.

15. The door system of claim 14, the computer memory further storing computer-executable instructions that, when executed by the processor, cause the door system to:
notify, in response to determining that the particular product is missing, an inventory management system that re-stocking of the particular product in the retail cooling storage container is needed.

16. A method involving a movable, non-transparent display on a surface of a retail cooling storage container, the method comprising:
determining, by a processor using image recognition, an inventory of one or more retail products physically contained in the retail cooling storage container;
generate, by the processor, a planogram of the one or more retail products physically contained in the retail cooling storage container;
displaying, on at least one non-transparent display on a surface of the retail cooling storage container, the planogram of the one or more retail products with current pricing information positioned alongside the one or more retail products on the planogram, wherein in a closed position, the at least one non-transparent display blocks viewability from outside of the retail cooling storage container of the one or more retail products physically contained in the retail cooling storage container;
displaying, on the at least one non-transparent display on the surface of the retail cooling storage container, a promotion of a retail product of the one or more retail products physically contained in the internal storage volume based on customer behavior analytics; and
transmitting, by the processor, data to a distributor and/or store regarding overall stock relating to the inventory of the one or more retail products.

17. The method of claim 16, wherein the image recognition is performed by at least one camera mounted on the back of the movable, non-transparent display, wherein the at least one camera is tilted at an angle relative to the movable, non-transparent display, the method further comprising:
triggering, by the processor, the at least one camera to capture, at intervals when the movable, non-transparent display is opened, a plurality of images of the one or more retail products physically contained in the retail cooling storage container.

18. The method of claim 16, further comprising:
generating, by the processor, the promotion of the retail product of the one or more retail products based on the customer behavior analytics, wherein the retail product is physically contained in the retail cooling storage container.

19. An apparatus for a retail cooling storage container comprising:
a non-transparent display on a surface of the retail cooling storage container that prohibits viewing of an internal storage volume of the retail cooling storage container, wherein the non-transparent display has a back;
a plurality of cameras mounted relative to the back of the non-transparent display, wherein the at least one camera of the plurality of cameras is tilted at an angle relative to the back, wherein the at least one camera is tilted at a 45° angle relative to the back and is mounted along an edge of the back, wherein the plurality of camera are pointing into the internal storage volume of the retail cooling storage container, and wherein the non-transparent display displays different things depending on what is detected by the plurality of cameras;
a computer processor;
a tangible non-transitory computer memory storing computer-executable instructions that, when executed by the computer processor, cause the apparatus to:
receive, from the plurality of cameras, an inventory of one or more retail products physically contained in the internal storage volume of the retail cooling storage container;
generate, by the processor, a planogram of the one or more retail products physically contained in the internal storage volume of the retail cooling storage container;
display, on the non-transparent display, the planogram of the one or more retail products with current pricing information positioned alongside the one or more retail products on the planogram, wherein in a closed position, the non-transparent display blocks viewability from outside of the retail cooling storage container of the one or more retail products physically contained in the internal storage volume; and
display, on the non-transparent display, a promotion of a retail product of the one or more retail products physically contained in the internal storage volume based on customer behavior analytics.

20. The apparatus of claim 19, wherein three cameras are housed within an empty bezel space between the non-transparent display and a mechanical frame at equal distances along a height of the back.

* * * * *

UNITED STATES PATENT AND TRADEMARK OFFICE
CERTIFICATE OF CORRECTION

Page 1 of 1

PATENT NO. : 10,769,666 B2
APPLICATION NO. : 16/222643
DATED : September 8, 2020
INVENTOR(S) : Avakian It is certified that error appears in the above-identified patent and that said Letters Patent is hereby corrected as shown below:

In the Claims

Column 10, Claim 8, Line 65:
Delete "7," and insert --claim 7,--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*